(12) United States Patent
Wadsworth

(10) Patent No.: US 9,868,147 B2
(45) Date of Patent: *Jan. 16, 2018

(54) METHOD OF MAKING COMPOSITE DECK CLIPS

(71) Applicant: SIMPSON STRONG-TIE COMPANY INC., Pleasanton, CA (US)

(72) Inventor: Kevin Wadsworth, Greenwood, IN (US)

(73) Assignee: SIMPSON STRONG-TIE COMPANY INC., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/581,650

(22) Filed: Apr. 28, 2017

(65) Prior Publication Data

US 2017/0232499 A1    Aug. 17, 2017

Related U.S. Application Data

(63) Continuation of application No. 14/676,113, filed on Apr. 1, 2015, which is a continuation of application
(Continued)

(51) Int. Cl.
*B21D 53/36* (2006.01)
*F16B 5/00* (2006.01)
(Continued)

(52) U.S. Cl.
CPC ........ *B21D 53/36* (2013.01); *B29C 45/14311* (2013.01); *E04F 15/02044* (2013.01); *E04F 15/04* (2013.01); *F16B 5/002* (2013.01); *F16B 5/0072* (2013.01); *F16B 5/0607* (2013.01); *F16B 5/0642* (2013.01); *F16B 11/006* (2013.01); *F16B 19/02* (2013.01);
(Continued)

(58) Field of Classification Search
CPC ... B29C 39/10; B21D 53/36; Y10T 29/49982; Y10T 29/49969; Y10T 29/49948; Y10T 29/49936; Y10T 29/49938; F16B 5/0607
See application file for complete search history.

(56) References Cited

U.S. PATENT DOCUMENTS

| 186,463 A | 1/1877 | Dickinson |
| 466,995 A | 1/1892 | Abramson |

(Continued)

FOREIGN PATENT DOCUMENTS

| CA | 2287104 A1 | 1/2001 |
| CH | 278212 | 10/1951 |

(Continued)

*Primary Examiner* — Jermie Cozart
(74) *Attorney, Agent, or Firm* — Shartsis Friese LLP; Cecily Anne O'Regan

(57) ABSTRACT

A composite clip for attaching decking. The clip includes a bottom and a top. The bottom is made of a first material. The top is made of a second material. The first material of the bottom is different than the second material of the top. The first material of the bottom engages in the second material of the top during manufacturing so as to attach the bottom to the top and form the gangable composite clip without a need for any other means to attach the bottom to the top.

12 Claims, 4 Drawing Sheets

Related U.S. Application Data

No. 13/999,255, filed on Feb. 3, 2014, now Pat. No. 9,003,624, which is a continuation-in-part of application No. 12/592,495, filed on Nov. 25, 2009, now Pat. No. 9,637,934, and a continuation of application No. 12/592,495, filed on Nov. 25, 2009, now Pat. No. 9,637,934.

(51) Int. Cl.

| | | |
|---|---|---|
| *F16B 5/06* | (2006.01) | |
| *F16B 11/00* | (2006.01) | |
| *F16B 19/02* | (2006.01) | |
| *E04F 15/02* | (2006.01) | |
| *B29C 45/14* | (2006.01) | |
| *E04F 15/04* | (2006.01) | |
| *B29K 101/12* | (2006.01) | |
| *B29K 705/00* | (2006.01) | |
| *B29L 1/00* | (2006.01) | |

(52) U.S. Cl.
CPC ...... *B29K 2101/12* (2013.01); *B29K 2705/00* (2013.01); *B29L 2001/007* (2013.01); *E04F 2015/02122* (2013.01); *Y10T 29/49936* (2015.01); *Y10T 29/49982* (2015.01)

(56) References Cited

U.S. PATENT DOCUMENTS

| | | |
|---|---|---|
| 695,722 A | 3/1902 | Heilmann |
| 1,184,080 A | 5/1916 | DiArcy |
| 1,241,885 A | 10/1917 | Roeder |
| 1,714,738 A | 5/1929 | Smith |
| 1,723,306 A | 8/1929 | Sipe |
| 1,990,001 A | 2/1935 | Rutten |
| 2,201,129 A | 5/1940 | Joseph |
| 2,332,081 A | 10/1943 | Hunt et al. |
| 2,337,156 A | 12/1943 | Elmendorf |
| 2,362,252 A | 11/1944 | Ellinwood |
| 2,398,603 A | 4/1946 | Soderberg |
| 2,406,387 A | 8/1946 | Lank |
| 2,526,116 A | 10/1950 | Browne |
| 3,045,294 A | 7/1962 | Livezey, Jr. |
| 3,293,106 A | 12/1966 | Cocco et al. |
| 3,319,983 A | 5/1967 | Jules |
| 3,458,618 A | 7/1969 | Bums et al. |
| 3,619,963 A | 11/1971 | Ornholt |
| 3,705,002 A | 12/1972 | Varlonga |
| 3,845,860 A | 11/1974 | Ladouceur et al. |
| 3,890,753 A | 6/1975 | Johansen |
| 3,899,116 A | 8/1975 | Mims |
| 3,973,151 A | 8/1976 | Bowcott |
| 4,106,962 A | 8/1978 | Adams et al. |
| 4,154,172 A | 5/1979 | Curtis |
| 4,449,346 A | 5/1984 | Tremblay |
| 4,454,699 A | 6/1984 | Strobl |
| 4,599,841 A | 7/1986 | Haid |
| 4,641,988 A | 2/1987 | Ganner |
| 4,682,458 A | 7/1987 | Sparrow |
| 4,716,704 A | 1/1988 | Murr |
| 4,736,507 A | 4/1988 | Berecz et al. |
| 4,905,437 A | 3/1990 | Heather |
| 5,004,027 A | 4/1991 | Legler et al. |
| 5,056,286 A | 10/1991 | Bokor |
| 5,071,280 A | 12/1991 | Turner |
| 5,086,997 A | 2/1992 | Glass |
| 5,160,211 A | 11/1992 | Gilb |
| D331,470 S | 12/1992 | Mitchell et al. |
| 5,182,891 A | 2/1993 | Slocum |
| 5,243,804 A | 9/1993 | Therrien et al. |
| 5,245,808 A | 9/1993 | Grunewald et al. |
| 5,250,058 A | 10/1993 | Miller et al. |
| 5,251,996 A | 10/1993 | Hiller et al. |
| 5,351,392 A | 10/1994 | Wing et al. |
| 5,359,954 A | 11/1994 | Kordelin |
| 5,377,732 A | 1/1995 | Fujii et al. |
| 5,419,649 A | 5/1995 | Gilb |
| 5,458,433 A | 10/1995 | Stastny |
| 5,480,117 A | 1/1996 | Fleming |
| 5,499,440 A | 3/1996 | Satoh et al. |
| 5,529,428 A | 6/1996 | Bischof |
| 5,564,248 A | 10/1996 | Callies |
| 5,603,580 A | 2/1997 | Leek et al. |
| 5,619,834 A | 4/1997 | Chen |
| 5,660,016 A | 8/1997 | Erwin et al. |
| 5,704,181 A | 1/1998 | Fisher et al. |
| 5,730,544 A | 3/1998 | Dils et al. |
| 5,743,672 A | 4/1998 | Cline |
| 5,746,535 A | 5/1998 | Kohler |
| 6,012,256 A | 1/2000 | Aschheim |
| 6,032,431 A | 3/2000 | Sugiyama |
| 6,298,533 B1 | 10/2001 | Nishimura et al. |
| 6,314,699 B1 | 11/2001 | West |
| 6,363,677 B1 | 4/2002 | Chen et al. |
| 6,402,415 B1 | 6/2002 | Eberle, III |
| 6,421,979 B1 | 7/2002 | Fischer et al. |
| 6,440,525 B1 | 8/2002 | Kessler et al. |
| 6,442,908 B1 | 9/2002 | Naccarato et al. |
| 6,449,918 B1 | 9/2002 | Nelson |
| 6,460,306 B1 | 10/2002 | Nelson |
| 6,470,641 B1 | 10/2002 | Faure |
| 6,471,434 B2 | 10/2002 | Chin et al. |
| D470,039 S | 2/2003 | Pelc |
| 6,637,163 B2 | 10/2003 | Thibault et al. |
| 6,651,398 B2 | 11/2003 | Gregori |
| 6,651,400 B1 | 11/2003 | Murphy |
| 6,711,864 B2 | 3/2004 | Erwin |
| D488,373 S | 4/2004 | Eberle |
| 6,810,633 B2 | 11/2004 | Harris |
| 6,851,884 B2 | 2/2005 | Eberle |
| 6,871,467 B2 | 3/2005 | Hafner |
| 7,025,551 B2 | 4/2006 | Haytayan |
| 7,052,200 B2 | 5/2006 | Harris |
| 7,383,663 B2 | 6/2008 | Pacione |
| 7,409,803 B2 | 8/2008 | Grohman |
| 7,465,905 B2 | 12/2008 | Braun |
| 7,984,599 B2 | 7/2011 | Snell et al. |
| 8,241,547 B2 | 8/2012 | Scherer et al. |
| 8,464,488 B2 | 6/2013 | Pelc |
| 9,003,624 B2 | 4/2015 | Wadsworth |
| 9,637,934 B2 * | 5/2017 | Wadsworth ............ E04F 15/02 |
| 9,700,931 B2 | 7/2017 | Wadsworth |
| 2002/0059766 A1 | 5/2002 | Gregori |
| 2002/0121064 A1 | 9/2002 | Erwin |
| 2003/0123924 A1 | 7/2003 | Eberle |
| 2006/0053720 A1 | 3/2006 | Oh |
| 2006/0107612 A1 | 5/2006 | Pelc |
| 2006/0147672 A1 | 7/2006 | Ruiz |
| 2006/0283122 A1 | 12/2006 | Burgess et al. |
| 2008/0279654 A1 | 11/2008 | Deschamps |
| 2015/0202678 A1 | 7/2015 | Wadsworth |
| 2017/0232499 A1 | 8/2017 | Wadsworth |

FOREIGN PATENT DOCUMENTS

| | | |
|---|---|---|
| DE | 372483 | 3/1923 |
| DE | 4036338 A1 | 6/1991 |
| EP | 863317 A2 | 9/1998 |
| FR | 1217468 A | 12/1959 |
| FR | 1556252 A | 12/1968 |
| FR | 2647837 A1 | 12/1990 |
| GB | 1350754 A | 4/1974 |
| GB | 1567008 A | 5/1980 |
| GB | 2124672 A | 2/1984 |
| JP | 4371657 B2 | 12/1992 |
| JP | 07189451 A | 7/1995 |

* cited by examiner

METHOD OF MAKING COMPOSITE DECK CLIPS

CROSS-REFERENCE

This application is a continuation application of Ser. No. 12/592,495, filed Nov. 25, 2009, entitled Gangable Composite Deck Clip, which issued into U.S. Pat. No. 9,637,934 on May 2, 2017, which is incorporated herein by reference in its entirety, and to which application priority under 35 USC §120 is claimed.

This application is also a continuation application of Ser. No. 14/676,113, filed Apr. 1, 2015, entitled Methods of Making a Clip for Attaching Decking, which is a continuation application of Ser. No. 13/999,255, filed Feb. 3, 2014, which issued into U.S. Pat. No. 9,003,624 on Apr. 14, 2015, which is a continuation-in-part of Ser. No. 12/592,495, filed Nov. 25, 2009, which issued into U.S. Pat. No. 9,637,934 on May 2, 2017, which applications are incorporated herein by reference in its entirety, and to which application priority under 35 USC §120 is claimed.

BACKGROUND

Field of the Invention

The embodiments of the present invention relate to a clip for attaching decking, and more particularly, the embodiments of the present invention relate to a gangable composite clip for attaching decking and method for making.

Description of the Prior Art

Numerous innovations for deck clips have been provided in the prior art, which will be described below in chronological order to show potential advancement in the art, and which are incorporated herein by reference thereto. Even though these innovations may be suitable for the specific individual purposes to which they address, however, they differ from the embodiments of the present invention in that they do not teach a gangable composite clip for attaching decking and method for making.

U.S. Pat. No. 3,845,860 A to Ladouceur et al

U.S. Pat. No. 3,845,860 A issued to Ladouceur et al on Nov. 5, 1974 in U.S. class 206 and subclass 338 teaches a fastener in a nut strip, which includes a pair of parallel retainer grooves adapted to receive a pair of retaining rods or wires that secure the fasteners in the pre-oriented strip form. The fastener is a pierce nut that includes a generally rectangular body portion having a piercing face and a pair of flanges at the opposite face, with one flange extending from each end of the nut. The rod retaining grooves are generally perpendicular to the opposite sides of the nut and are located between the flanges and the axis of the threaded aperture. The rods are inserted in the retaining grooves and the fastener, adjacent the grooves, and are deformed to retain the rods in the grooves. The nut strip and coil includes a plurality of aligned nuts, each having a pair of grooves on either side of the nut bore. The frangible rods or elements are retained in the nut grooves and bridge adjacent nuts. The end faces of the nuts, adjacent the grooves, are knurled, which spaces the nuts on the rods in close relation, securely retains the rods, and deforms the cylindrical rods into an oval shape. The knurling provides a plurality of portions projecting over and engaging the rods.

U.S. Pat. No. 6,314,699 B1 to West

U.S. Pat. No. 6,314,699 B1 issued to West on Nov. 13, 2001 in U.S. class 52 and subclass 489.1 teaches a deck system with a deck clip. The deck system includes deck boards in which receiving chambers are formed. The receiving chambers are formed in both opposing side edges of each deck board, and each chamber is defined in part by a lip edge. The deck boards are placed side-by-side during construction of a deck, closely spaced, so that the lip edges of adjacent deck boards define a narrow channel space therebetween in which a rotatable deck clip is placed. The clip has a first overhang member and an opposing second overhang member, and is thereby wider in a first horizontal dimension and shorter in a second, perpendicular horizontal dimension, and is rotatably attached to the deck joists by a screw or other fastening device. When the clip is rotated into a first position, its first and second overhang members extend into the receiving chambers of adjacent deck boards and engage the lip edges of each chamber to hold the deck boards securely in place upon the joists. Users may easily remove a deck board by simply rotating the clip ninety degrees to thereby move the overhang members of the clip into the channel space between the lip edges, and the deck boards are thereby released.

U.S. Pat. No. 6,402,415 B1 to Eberle, III.

U.S. Pat. No. 6,402,415 B1 issued to Eberle, III on Jun. 11, 2002 in U.S. class 403 and subclass 231 teaches an anchoring biscuit device for joining three boards. It includes a first substantially flat horizontal top element having a generally biscuit-shaped configuration, at least one substantially vertical support member attached to the underside of the top element and extending downwardly therefrom for a predetermined length for joinder of two adjacent boards that have been pre-cut with biscuit receiving slots, and an attachment orifice located at least on the top element for attachment of the anchoring biscuit device to a support board for anchoring and support of the two adjacent boards. In one preferred embodiment, a top bevel is included at the orifice to permit angled screwing at positions other than vertical positions. In other embodiments, the screw orifice has an oval or elongated shape to likewise enable screwing at angles other than vertical. In yet another preferred embodiment, the orifice is both beveled and elongated.

United States Patent Application Publication Number US 2002/0121064 A1 to Erwin.

United States Patent Application Publication Number US 2002/0121064 A1 published to Erwin on Sep. 5, 2002 in U.S. class 52 and subclass 586.1 teaches a plank having a wood core with a groove formed in each of its sides and a protective cladding formed on its top surface. The wood core is formed by bonding a plurality of wood strips or chips together. The cladding is provided by a sheet of a material selected from the group consisting of plastic, polyvinyl chloride (PVC), acrylic, polycarbonate, and composites thereof that is bonded to the top surface or by two or another number of sheets of a material selected from the group consisting of polyester, phenol, epoxy, and composites thereof that are sprayed or rolled onto the top surface. T-shaped connector clips are provided with the arms receivable in the grooves of the plank for securing adjacent planks together.

U.S. Pat. No. 6,470,641 B1 to Faure.

U.S. Pat. No. 6,470,641 B1 issued to Faure on Oct. 29, 2002 in U.S. class 52 and subclass 480 teaches an assembly device without visible screws for assembly of two parallel wooden slats, which includes an intercalated fixing element engaged in two positioning grooves arranged side-by-side in the side faces. The fixing element includes a metal slide having a base-part equipped with an oblong aperture extending longitudinally in the central-part for the screw to pass through, two securing wings oriented in opposite directions from one another and designed to press in the grooves when the screw is tightened, and a screw head whose external dimension is greater than the visible second gap and which is arranged above the grooves between the upper edges of the two wooden slats.

United States Patent Application Publication Number US 2003/0123924 A1 to Eberle, III.

United States Patent Application Publication Number US 2003/0123924 A1 published to Eberle, III on Jul. 3, 2003 in U.S. class 403 and subclass 12 teaches an anchoring device for joining three boards. It includes a substantially flat horizontal top element having a top view configuration that includes two sides and has a first predetermined width as measured side-to-side at its maximum width between the two sides. There is at least one substantially vertical support member attached to the underside of the top element along an imaginary center line and extending downwardly from the top element for a predetermined length, which has two sides and a second predetermined width as measured side-to-side at its maximum width. There is a substantially flat horizontal bottom element that includes two sides and has a third predetermined width as measured side-to-side at its maximum width. The first predetermined width is greater than both the second predetermined width and the third predetermined width, and the third predetermined width is greater than the second predetermined width. A decking system utilizes the anchoring device.

U.S. Pat. No. 6,711,864 B2 to Erwin.

U.S. Pat. No. 6,711,864 B2 issued to Erwin on Mar. 30, 2004 in U.S. class 52 and subclass 582.1 teaches a plank having a wood core with a groove formed in each of its sides and a protective cladding formed on its top surface. The wood core is formed by bonding a plurality of wood strips or chips together. The cladding is provided by a sheet of a material selected from the group consisting of plastic, polyvinyl chloride (PVC), acrylic, polycarbonate, and composites thereof that is bonded to the top surface or by two or another number of sheets of a material selected from the group consisting of polyester, phenol, epoxy, arid composites thereof that are sprayed or roiled onto the top surface. T-shaped connector clips are provided with the arms receivable in the grooves of the plank for securing adjacent planks together.

U.S. Pat. No. 6,851,884 B2 to Eberle.

U.S. Pat. No. 6,851,884 B2 issued to Eberle on Feb. 8, 2005 in U.S. class 403 and subclass 231 teaches an anchoring biscuit device for joining three boards. It includes, a first substantially flat horizontal top element having a generally biscuit-shaped configuration with opposite sidewalls, at least one of said sidewalls having a flat edge and at least a portion of the sidewalls being non-parallel with respect to one another, at least one substantially vertical support member attached to the underside of the top element and extending downwardly therefrom for a predetermined length for joinder of two adjacent boards that have been pre-cut with biscuit receiving slots, and an attachment orifice located at least on the top element for attachment of the anchoring biscuit device to a support board for anchoring and support of the two adjacent boards. In one preferred embodiment, a top bevel is included at the orifice to permit angled screwing at positions other than vertical.

U.S. Pat. No. 6,871,467 B2 to Hafner.

U.S. Pat. No. 6,871,467 B2 issued to Hafner on Mar. 29, 2005 in U.S. class 52 and subclass 586.1 teaches a decking system and clip apparatus used therein. The clip apparatus typically includes a top portion and a pair of lateral projections extending from opposite sides of the top portion. Each lateral projection is configured to contact a respective decking member, thereby maintaining a predefined distance between the decking members. The clip apparatus further typically includes a pair of spaced-apart downward projections extending downward from the top portion. The downward projections are separated by a void sized to receive the joist.

U.S. Pat. No. 7,052,200 B2 to Harris.

U.S. Pat. No. 7,052,200 B2 issued to Harris on May 30, 2006 in U.S. class 403 and subclass 231 teaches a fastener for securing deck boards to a support structure without the need for driving screws or nails through the deck boards. The fastener includes two horizontal flanges that fit into slots cut into the sides of adjacent deck boards, a center hole for securing the fastener to the support structure, and deformable resilient elements that bridge a gap between adjacent deck boards during fastening, yet compress inward when the boards swell and expand.

U.S. Pat. No. 7,409,803 B2 to Grohman.

U.S. Pat. No. 7,409,803 B2 issued to Grohman on Aug. 12, 2008 in U.S. class 52 and subclass 489.1 teaches a deck system employing a plurality of substantially hidden fasteners to couple floor boards of the deck to joists. Each hidden fastener is rigidly coupled to a respective joist and positioned between a pair of adjacent floorboards. Each fastener forms a mating relationship with specially configured sides of the boards to thereby rigidly couple the boards to the joists.

It is apparent that numerous innovations for deck clips have been provided in the prior art, which are adapted to be used. Furthermore, even though these innovations may be suitable for the specific individual purposes to which they address, however, they would not be suitable for the purposes of the present invention as heretofore described, namely, a gangable composite clip for attaching decking and method for making.

SUMMARY

Thus, it is an object of the embodiments of the present invention to provide a gangable composite clip for attaching decking and method for making, which avoids the disadvantages of the prior art.

Briefly stated, another object of the embodiments of the present invention is to provide a gangable composite clip for attaching decking. The clip includes a bottom and a top. The bottom is made of a first material. The top is made of a second material. The first material of the bottom is different than the second material of the top. The first material of the bottom engages in the second material of the top during manufacturing so as to attach the bottom to the top and form the gangable composite clip without a need for any other means to attach the bottom to the top.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying drawings.

BRIEF DESCRIPTION OF THE DRAWINGS

The figures of the drawings are briefly described as follows.

DETAILED DESCRIPTION

Figure 1:
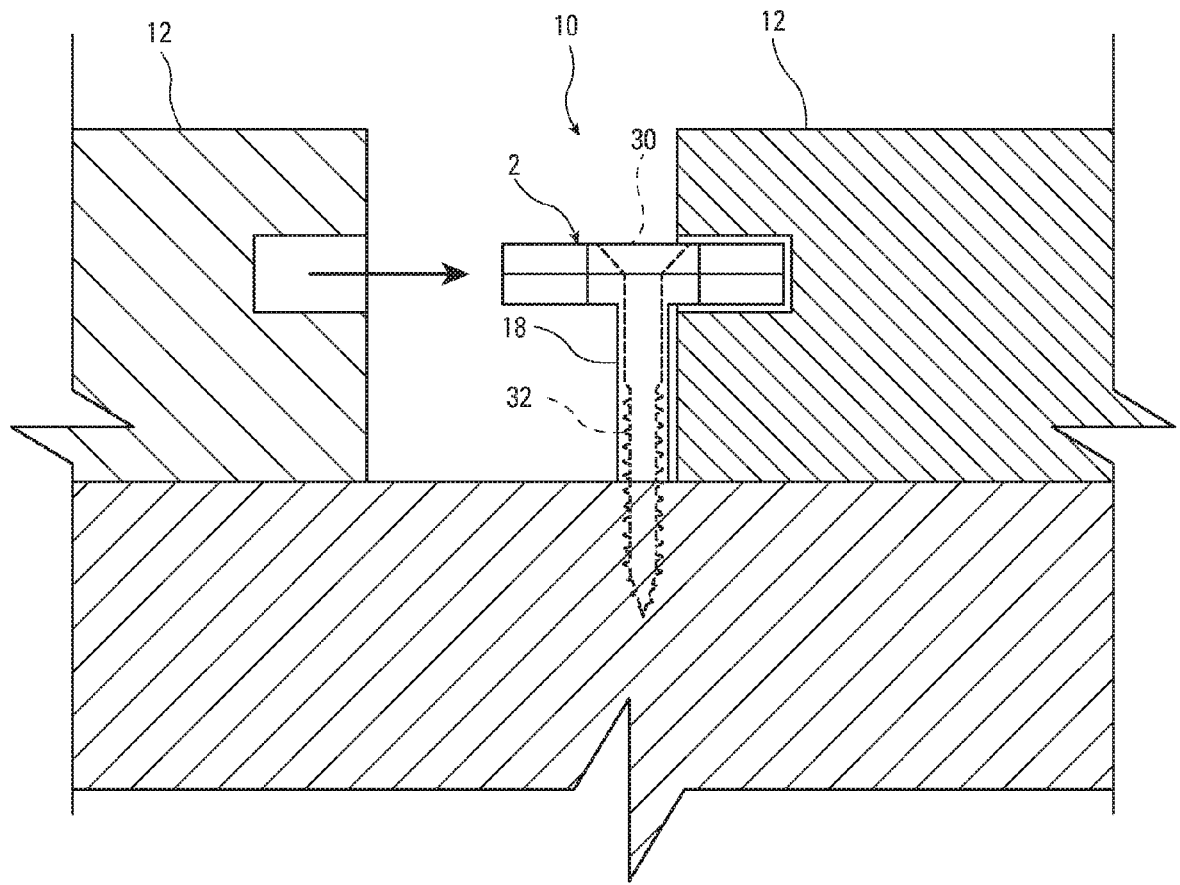
FIG. 1 is a diagrammatic cross sectional view of the gangable composite clip of the embodiments of the present invention attaching decking.

List of Reference Numerals Utilized in the Drawing.

A. General.

10 Gangable composite clip of embodiments of present invention for attaching decking 12 Decking B. Configuration of Gangable Composite Clip 10.

14 Bottom

16 Top

18 Upright portion

20 Transverse clip portion

21 Portion of transverse clip portion 20

22 Remaining portion of transverse clip portion 20

24 One axis of transverse clip portion 20

26 Other axis of transverse clip portion 20

27 Mounting through bore

28 Countersink of mounting through bore 27 for setting the head 30 of the mounting screw 32 flush with top 16

30 Head of mounting screw 32

32 Mounting screw

34 Plurality of bonding through bores in top 16

35 Plurality of posts extending from the upper surface of the bottom portion of the transverse clip portion 21 through the plurality of bonding through ones 34

36 Lower portion of each bonding through bore of plurality of bonding through bores 34 in top 16

38 Upper portion of each bonding through bore of plurality of bonding through bores 34 in top 16

C. Ganging the Gangable Composite Clip 10.

40 Connectors for facilitating installation of gangable composite clip 10

42 Handle for further facilitating installation of the gangable composite clip 10

Detailed Description of the Preferred Embodiments

A. General.

Referring now to the drawings, and particularly top FIG. 1, which is a diagrammatic cross sectional view of the gangable composite clip of the embodiments of the present invention attaching decking, the gangable composite clip of the embodiments of the present invention is shown generally at 10 for attaching decking 12.

The configuration of the gangable composite clip 10.

Figure 2:
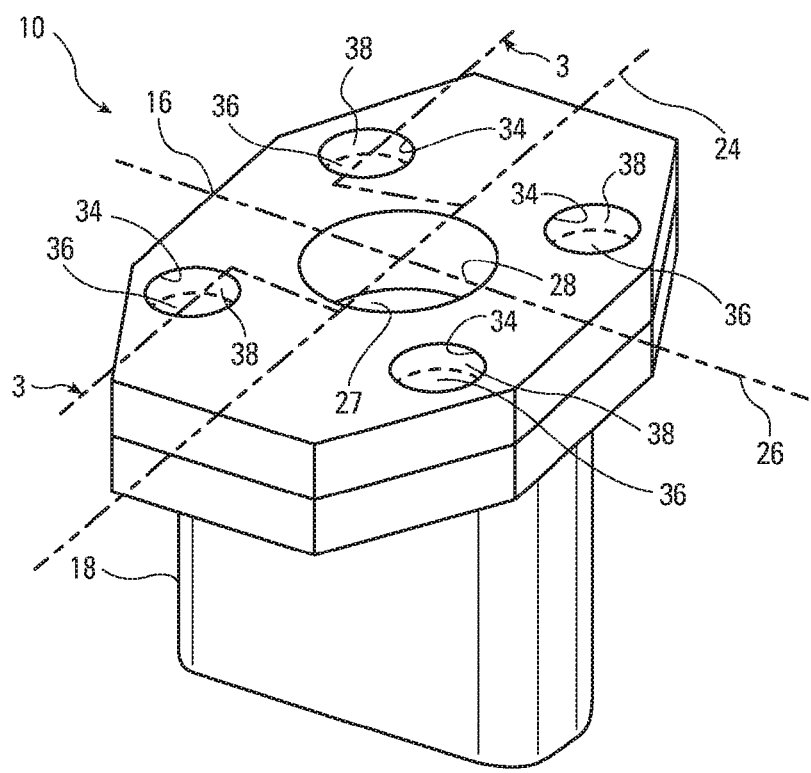
FIG. 2 is an enlarged diagrammatic perspective view of the gangable composite clip of the embodiments of the present invention identified by ARROW 2 in FIG. 1.
Figure 3:
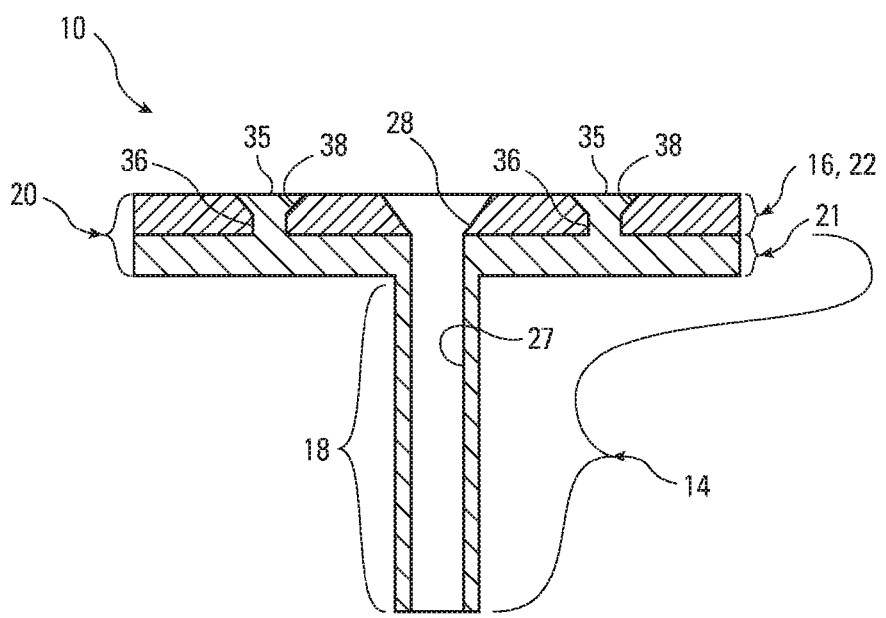
FIG. 3 is a diagrammatic cross sectional view taken along LINE 3-3 in FIG. 2.

The overall configuration of the gangable composite clip 10 can best be seen in FIG. 2 and FIG. 3, which are, respectively, an enlarged diagrammatic perspective view of the gangable composite clip of the embodiments of the present invention identified by ARROW 2 in FIG. 1, and a diagrammatic cross sectional view taken along LINE 3-3 in FIG. 2, and as such, will be discussed with reference thereto.

The gangable composite clip 10 comprises a bottom 14 and a top 16. The bottom 14 is made of a first material. The top 16 is made of a second material. The first material of the bottom 14 is different than the second material of the top 16. The first material of the bottom 14 engages in the second material of the top 16 during manufacturing so as to attach the bottom 14 to the top 16 and form the gangable composite clip 10 without a need for any other means to attach the bottom 14 to the top 16.

The first material of the bottom 14 is, preferably, plastic, but is not limited to that, while the second material of the top 16 is, preferably, exterior grade metal, but is not limited to that.

The gangable composite clip 10 is generally T-shaped in side view, and as such, has an upright portion 18 and a transverse clip portion 20. The upright portion 18 and a transverse bottom member portion 21 of the transverse clip portion 20 form the bottom member 14, and as such, gives the bottom member 14 a generally T-shape in side view, while a remaining top portion 22 of the transverse clip portion 20 forms the top member 16. The upright portion 18 is for providing proper and uniform spacing between adjacent deckings 12 (FIG. 1). As shown in the cross-section of FIG. 3, the transverse bottom member portion 21 has posts that extend upwardly from a bottom surface of the transverse bottom member portion 21 through corresponding apertures formed by the through bores 34 in the top portion 22 forming the top member 16. The posts 35 are mounting posts around which the through bores 34 are positioned. Additionally, as illustrated the through bores 34 are positioned on the top surface of the transverse bottom member portion 21 away from the central mounting through bore 27 which passes centrally through the upright portion 18 and the transverse bottom portion 21 and forms a central countersink 28 at the top member 16.

The transverse clip portion 20 is generally octagon-shaped in plan view, but has one axis 24 thereof longer than the other axis 26 thereof so as to be asymmetrical.

The gangable composite clip 10 has a mounting through the central mounting through bore 27. The mounting through the central mounting through bore 27 passes centrally, continuously, and vertically through both the bottom 14 and the top 16.

The mounting through bore 26 has a central countersink 28. The central countersink 28 of the mounting through bore 26 is disposed through the top 16 for setting the head 30 of a mounting screw 32 flush with the top 16 (FIG. 1).

The top 16 has a plurality of bonding through bores 34. The plurality of bonding through bores 34 in the top 16 pass vertically and continuously therethrough, are disposed outboard of the mounting through bore 26, are, preferably, two or four in number, but is not limited to that, and may be of varying shape.

Each bonding through bore 34 in the top 16 has a lower portion 36 and an upper portion 38. The upper portion 38 of each bonding through bore 34 in the top 16 extends upwardly from, and is wider than, the lower portion 36 of an associated bonding through bore 34 in the top 16 so as to allow the first material of the bottom 14 to flow through the lower portion 36 of the associated bonding through bore 34 in the top 16 and captively engage in the upper portion 38 of each bonding through bore 34 in the top 16 during manufacturing so as to attach the bottom 14 to the top 16 and form the gangable composite clip 10 without a need for any other means to attach the bottom 14 to the top 16.

Ganging the Gangable Composite Clip 10.

Figure 4:
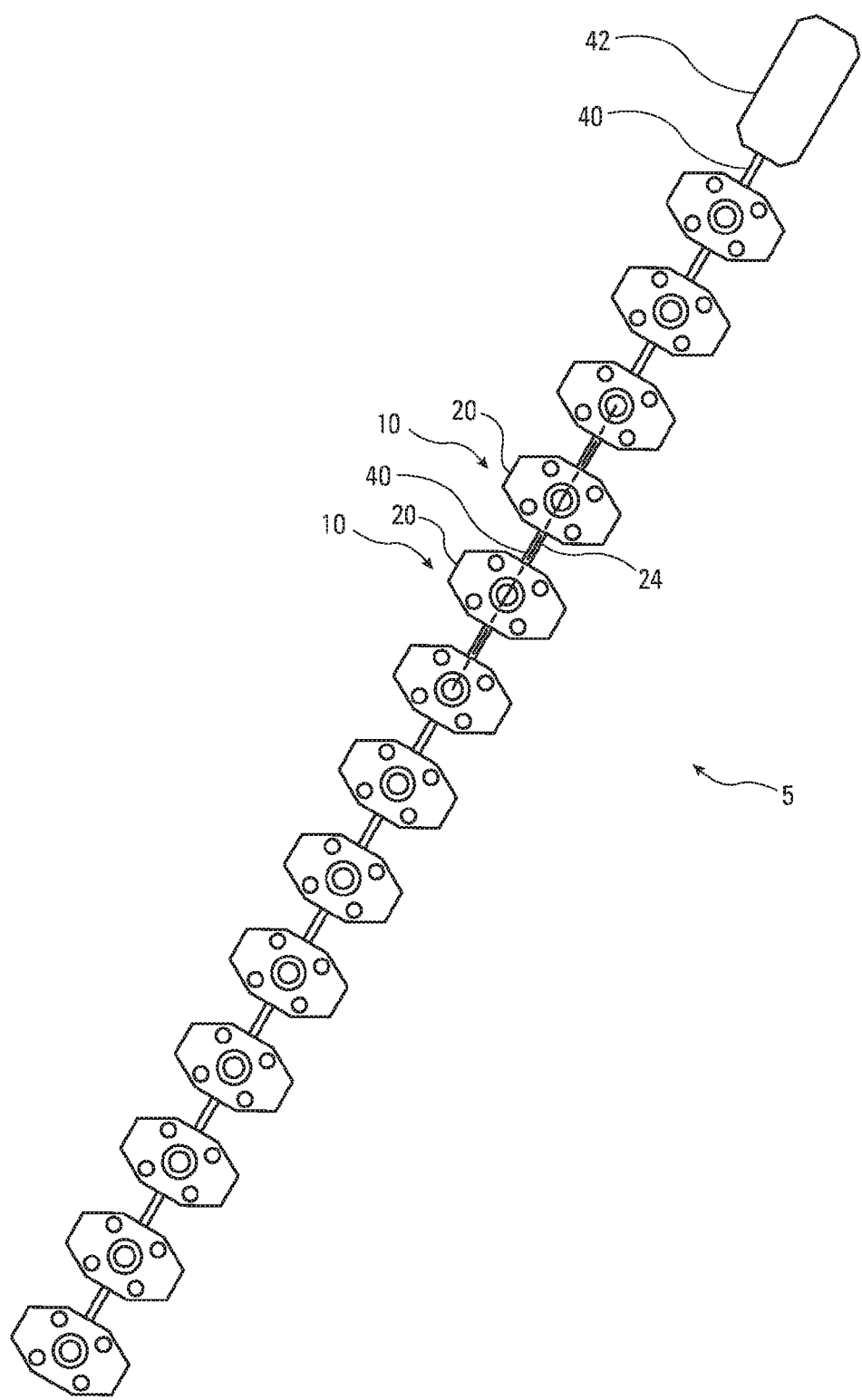
FIG. 4 is a diagrammatic top plan view illustrating multiple gangable composite clips of the embodiments of the present invention manufactured ganged together for facilitating use and including a removable handle for further facilitating use.
Figure 5:
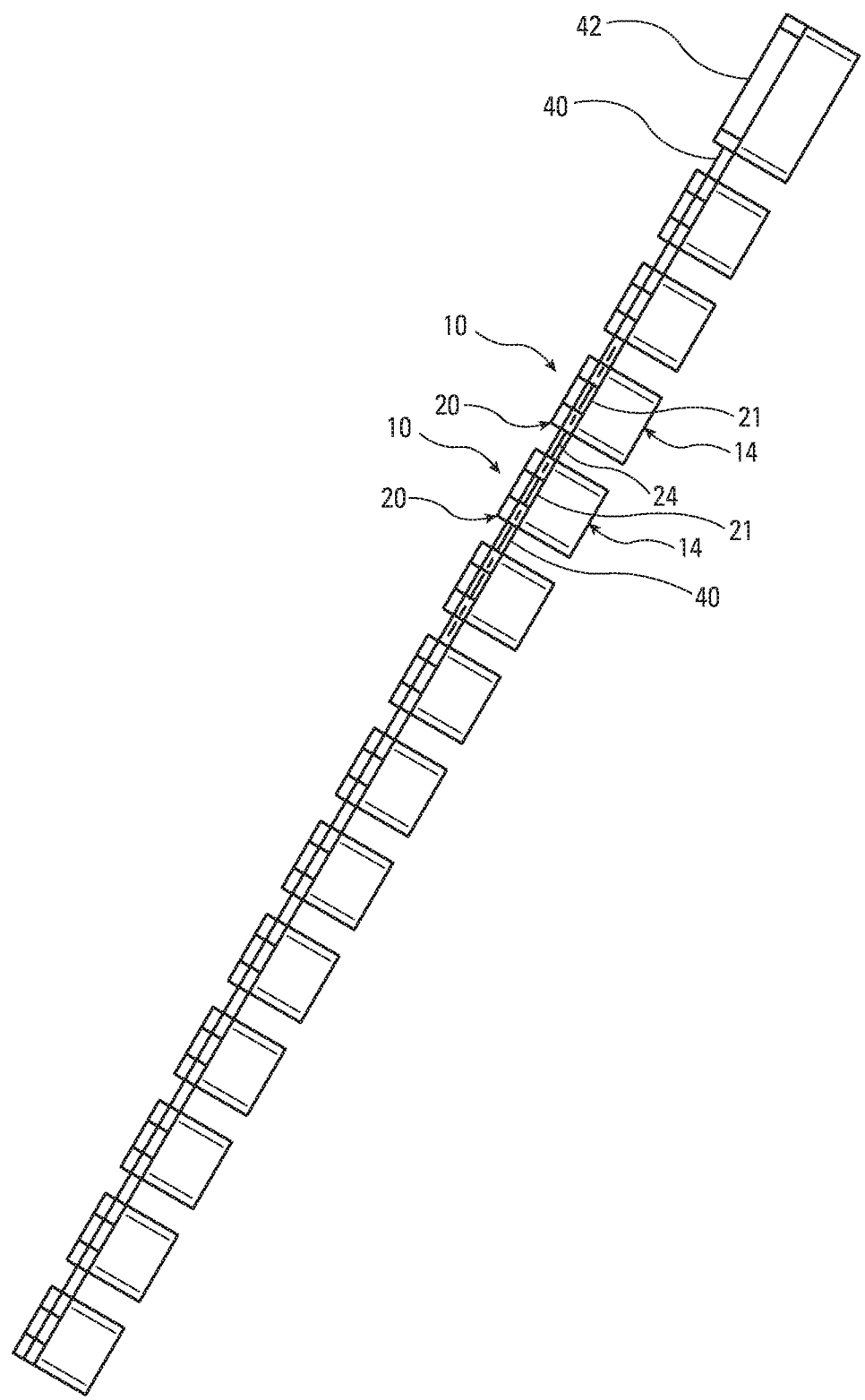
FIG. 5 is a diagrammatic side elevational view taken generally in the direction of ARROW 5 in FIG. 4.

Ganging the gangable composite clip 10 can best be seen in FIGS. 4 and 5, which are, respectively, a diagrammatic top plan view illustrating multiple gangable composite clips of the embodiments of the present invention manufactured ganged together for facilitating use and including a removable handle for further facilitating use, and a diagrammatic side elevational view taken generally in the direction of ARROW 5 in FIG. 4, and as such, will be discussed with reference thereto.

The gangable composite clips 10 are ganged together in a side-by-side, or end-to-end, and spaced-apart relationship along the other axis 26 thereof by connectors 40. The connectors 40 are thin, elongated, of the first material, readily breakable, and formed connecting the adjacent transverse bottom member portion 21 of the transverse clip portion 20 of each gangable composite clip 10 to each other during manufacturing for facilitating installation of the gangable composite clip 10.

The gangable composite clips 10 further include a handle 42. The handle 42 extends from a connector 40 extending from a first ganged composite clip 10 for further facilitating installation of the gangable composite clip 10, and has a shape generally that of the gangable composite clip 10.

Impressions.

It will be understood that each of the elements described above or two or more together may also find a useful application in other types of constructions differing from the types described above.

While the embodiments of the present invention have been illustrated and described as embodied in a gangable composite clip for attaching decking and method for making, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features from the standpoint of prior art fairly constitute characteristics of the generic or specific aspects of the embodiments of the present invention.

What is claimed is:

1. A method of making a decking clip comprising:
    forming a top member from an exterior grade metal, the top member having a top member central aperture and a plurality of bonding through bores positioned away from the top member central aperture and the top member defining a top member outer perimeter;
    forming a bottom member from a plastic material, the bottom member having a transverse portion with an upper surface, a perpendicular upright portion, a central bore passing through the transverse portion and the perpendicular upright portion, and a plurality of mounting posts which extend from the upper surface of the transverse portion of the bottom member which are spaced away from the central bore wherein the transverse portion defines a transverse member outer perimeter; and
    engaging the bottom member and the top member wherein each individual mounting post of the plurality of mounting posts passes through a corresponding bonding through bore of the plurality of bonding through bores in the top member to secure the bottom member to the top member,
    wherein the top member outer perimeter is no greater than the transverse member outer perimeter.

2. The method of making a decking clip of claim 1, wherein the decking clip has a generally T-shaped side view.

3. The method of making a decking clip of claim 1, wherein the transverse portion of the bottom member has an octagonal shape.

4. The method of making a decking clip of claim 3, wherein a first axis of the transverse portion of the bottom member is longer than a second perpendicular axis of the transverse portion of the bottom member.

5. The method of making a decking clip of claim 1, wherein the central aperture is countersunk.

6. The method of making a decking clip of claim 5, wherein the countersunk central aperture is configured for setting a head of a mounting screw flush with an upper surface of the top member.

7. The method of making a decking clip of claim 5, wherein the clip is connected to an adjacent clip in a spaced-apart relationship.

8. The method of making a decking clip of claim 7, wherein the clip is breakable from the adjacent clip.

9. The method of making a decking clip of claim 7, further comprising a handle.

10. The method of making a decking clip of claim 9, wherein the handle extends from a first ganged clip.

11. The method of making a decking clip of claim 9, wherein the handle has a shape generally that of the top of the transverse clip.

12. The method of making a decking clip of claim 1 wherein the mounting posts have at least a first diameter at a first location along a length of each of the mounting posts and a second diameter at a second location along the length of each of the mounting posts, different than the first diameter.

* * * * *